UNITED STATES PATENT OFFICE.

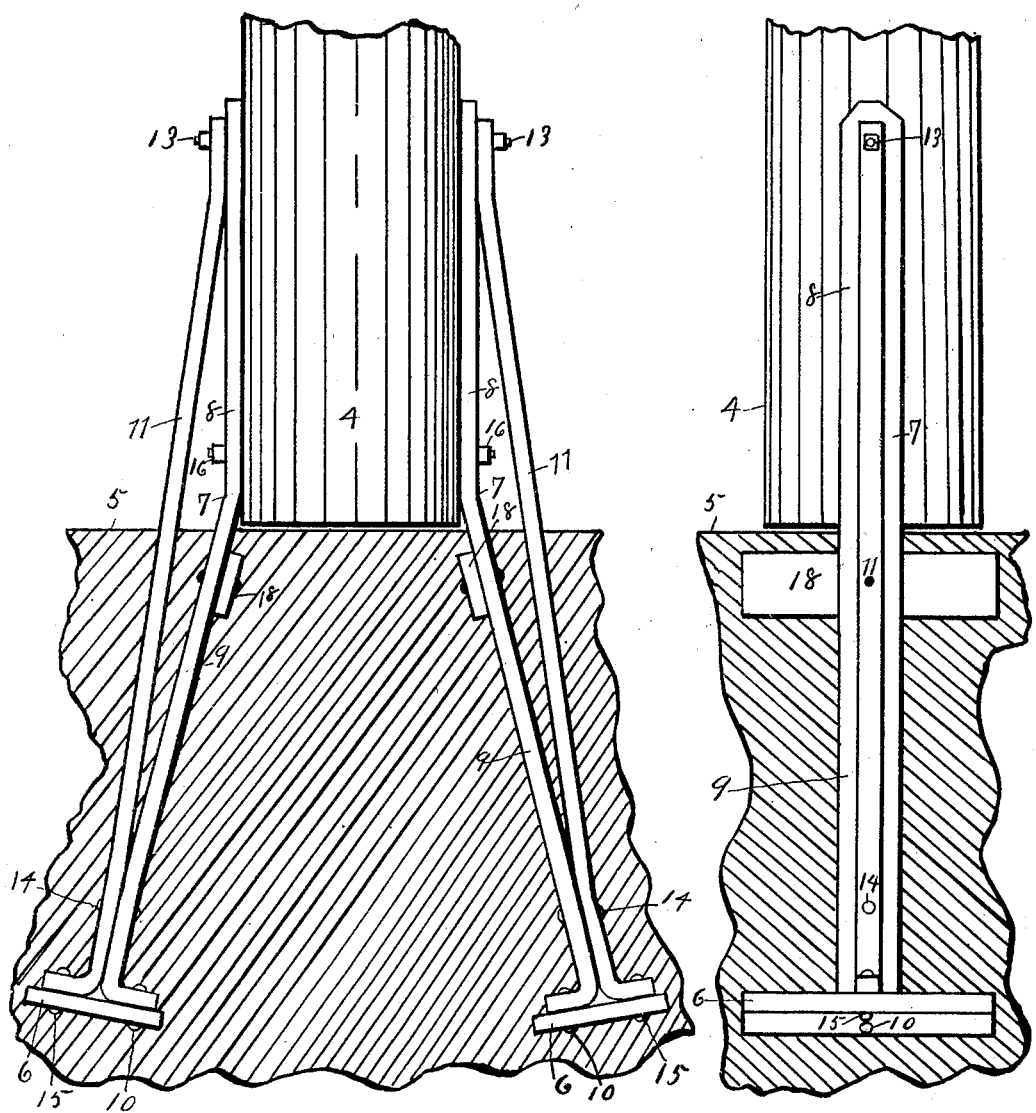

WARREN W. HILL, OF TEXAS, MICHIGAN, ASSIGNOR OF ONE-HALF TO GLENN L. SHIPMAN, OF KALAMAZOO, MICHIGAN.

METALLIC ANCHOR FOR POLES OR POSTS.

SPECIFICATION forming part of Letters Patent No. 718,841, dated January 20, 1903.

Application filed September 25, 1902. Serial No. 124,771. (No model.)

*To all whom it may concern:*

Be it known that I, WARREN W. HILL, a citizen of the United States, residing at Texas, in the county of Kalamazoo, State of Michigan, have invented a new and useful Metallic Anchor for Poles or Posts, described and claimed in the accompanying specification.

The object of this invention is to provide metallic anchors for sustaining telegraph and telephone poles or other poles and posts desired in their upright position, as when in use, the design being to not only apply the anchors to new poles when being erected, but to apply them to poles already set and which have become rotten in the ground almost to the danger-point of falling, and to apply them to poles which may have rotted entirely off and fallen, and thus reclaim poles which would be otherwise discarded. In carrying out this object I design to effect economy in labor in reclaiming old poles and in the saving of new poles, since if they are provided with the anchors when first set new they are prevented from rotting off in the ground.

In the accompanying drawings, forming a part of this specification, Figure 1 is an elevation of the lower end of a pole broken away and showing the anchors attached, a portion of them being buried in the ground, said ground being in vertical section; Fig. 2, a view of Fig. 1, looking from a point at either the right or left hand.

Referring to the parts of the drawings pointed out by numerals, 4 is supposed to illustrate a telegraph or telephone pole, the lower end of which when set new may either rest upon the ground or, as here shown, be sustained by the anchors near to the ground 5, Figs. 1 and 2. The anchors are approximately seven feet long, three feet above the ground 5, being attached to the pole 4 at each of its two opposite sides and four feet buried in the ground 5, but their dimensions may be varied, as desired.

The main bar 7 has an upper straight portion 8 for attaching to the side of the post 4 and an outwardly-flaring or laterally-oblique portion 9, which is buried in the ground 5. The lower end of this oblique portion 9 is inwardly turned at an angle and riveted or otherwise attached to the bed-plate 6 near its inner edge at 10, Figs. 1 and 2. An oblique truss-bar 11 is formed to fit against the face of the upper and lower ends of the main bar 7, where it is attached to it at 13 and 14. By reference to Fig. 2 it will be seen that the truss-bar 11 is narrower than main bar 7, to which it is attached, by which means it is of sufficient strength and a thorough packing of the earth against and around it is facilitated.

The lower end of the truss-bar 11 is outwardly turned at an angle and riveted or otherwise attached to the bed-plate 6 near its outer edge at 15, Figs. 1 and 2. The fastening at 13 is a bolt, also performing the attachment of the upper end of the main bar 7 to the pole 4, and this portion 8 of the main bar 7 is also attached to the pole lower down at 16. The bed-plates 6 are approximately eight inches wide by twelve inches long, but not necessarily this size.

The anchors are so set that the bed-plates rest in the ground with their longest way in the direction of the line-wires attached to the pole 4, or at approximately right angles to the outwardly-flaring portion of the anchor, thus giving the bed-plates sufficient bracing effect in that direction.

The flaring apart of that portion of the anchors in the ground is transversely to the direction of the line-wires. In other words, if the poles are along a track in the usual manner one of the anchors would be between the track and pole and attached to that side of the pole, and the other anchor would be attached to the side of the pole directly opposite. By this means the greatest support comes to guard against the canting over laterally of the poles, as it is expected they are more or less sustained in the other direction by the line-wires when said poles rot off. To provide still greater firmness of support laterally, I set the bed-plates 6 obliquely—that is, with their outer edges the highest—by which means they better brace a strain in either lateral direction. In case of very large poles I employ rectangular wings 18, Figs. 1 and 2, much longer than wide and attached transversely to the main bars 7 a little below the surface of the ground 5. Their longest direction is set in the direction of the lines of wire, and they being oblique thus have a great bracing purchase against any lateral strain of the pole 4.

In case of poles already up, but which owing to their decayed condition in the ground are almost ready to fall, and hence in condition for being replaced with new poles, my anchors can be attached to the lower end of them in the manner described without taking the poles down, the decayed part being allowed to remain in the ground. By this means much labor is saved, and there is no necessity for purchasing new poles.

Any suitable metal may be used, and it may be galvanized or coated over, if desired.

The anchors may be used with poles or posts, if desired, which are set into the ground; but as a rule it is thought they will be as well to rest on the ground or be sustained a little above its upper surface, as stated.

Having thus described my invention, what I claim as new, and desire to secure by Letters Patent of the United States of America, is—

1. Pole or post anchors, each consisting of the main bar having the portion for attachment to the side of the pole at the lower end, and the outwardly-flaring portion for burying in the ground, the truss-bar having its ends attached to the upper and lower ends of the main bar, said main bars and truss-bars provided with the lower angled ends, the oblique bed-plate set with its outer edge the highest and attached to said angles, and the oblique wing attached to the oblique portion of the main bar in position to come below the surface of the ground, substantially as set forth.

2. The combination of a post or pole, anchors attached to two opposite sides of the pole or post at the lower end, said anchors being partly within and partly without the ground, provided with the truss-bars, and those portions which are in the ground flaring apart laterally, and the bed-plates attached to the lower ends in the ground and set obliquely, substantially as set forth.

In testimony of the foregoing I have hereunto set my hand in the presence of two witnesses.

WARREN W. HILL.

Witnesses:
R. G. WEST,
LUCIUS C. WEST.